United States Patent
Tormasov et al.

(10) Patent No.: US 10,394,659 B2
(45) Date of Patent: Aug. 27, 2019

(54) SYSTEM AND METHOD FOR PROVIDING COMPREHENSIVE BACKUP OF MODULAR MOBILE DEVICES

(71) Applicant: Acronis International GmbH, Schaffhausen (CH)

(72) Inventors: Alexander G. Tormasov, Moscow (RU); Stanislav S. Protassov, Moscow (RU); Serguei M. Beloussov, Costa del Sol (SG); Mark Shmulevich, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 279 days.

(21) Appl. No.: 15/405,659

(22) Filed: Jan. 13, 2017

(65) Prior Publication Data

US 2017/0199671 A1    Jul. 13, 2017

Related U.S. Application Data

(60) Provisional application No. 62/278,389, filed on Jan. 13, 2016.

(51) Int. Cl.
| | | |
|---|---|---|
| *G06F 9/44* | (2018.01) | |
| *G06F 11/14* | (2006.01) | |
| *H04W 8/30* | (2009.01) | |

(52) U.S. Cl.
CPC ........... *G06F 11/1451* (2013.01); *H04W 8/30* (2013.01)

(58) Field of Classification Search
CPC ...... G06F 11/1451; G06F 11/53; G06F 11/56; G06F 11/58; G06F 11/69
USPC .................................................. 717/120–126
See application file for complete search history.

(56) References Cited

U.S. PATENT DOCUMENTS

| | | | | |
|---|---|---|---|---|
| 5,713,024 A | * | 1/1998 | Halladay ............. | G06F 11/1438 714/13 |
| 7,051,327 B1 | * | 5/2006 | Milius ........................ | G06F 8/65 717/168 |
| 7,099,900 B1 | * | 8/2006 | Bromley ............. | G06F 11/1451 707/652 |
| 7,620,666 B1 | * | 11/2009 | Root ................... | G06F 11/1451 |

(Continued)

OTHER PUBLICATIONS

Killijian et al, "Collaborative Backup for Dependable Mobile Applications", ACM, pp. 146-149, 2004 (Year: 2004).*

(Continued)

*Primary Examiner* — Anil Khatri
(74) *Attorney, Agent, or Firm* — Arent Fox LLP; Michael Fainberg

(57) ABSTRACT

A system and method for backup and recovery of user mobile device modules, settings and configurations. An example system includes a modular mobile device and a number of interconnected modules that can be connected to the mobile device. The device includes memory that stores configuration and setting parameters associated with each of the modules. In operation, a backup software utility monitors the configuration and setting parameters to detect additions and modifications and the transmits the detected additions and modifications to remote data storage to generate a data backup indicating a current state of the configuration and setting parameters. As a result, the modular mobile device can always return to a previous state for each module if it is replaced or the software is reinstalled, for example.

18 Claims, 5 Drawing Sheets

(56) References Cited

U.S. PATENT DOCUMENTS

| | | | | |
|---|---|---|---|---|
| 7,729,690 | B1* | 6/2010 | Huang | H04M 1/72522 455/412.1 |
| 7,987,449 | B1* | 7/2011 | Marolia | G06F 8/68 717/120 |
| 8,423,511 | B1* | 4/2013 | Bhatia | G06F 21/6218 707/654 |
| 8,600,941 | B1* | 12/2013 | Raj | H04L 67/1095 707/640 |
| 8,930,320 | B2* | 1/2015 | Tung | G06F 11/1451 707/654 |
| 8,978,012 | B1* | 3/2015 | Poole | G06F 11/0748 717/124 |
| 9,015,662 | B2* | 4/2015 | Oslake | G06F 8/30 717/117 |
| 9,390,109 | B2* | 7/2016 | Pawar | G06F 11/1474 |
| 9,823,977 | B2* | 11/2017 | Dornemann | G06F 11/1435 |
| 9,983,936 | B2* | 5/2018 | Dornemann | G06F 11/1435 |
| 2010/0031063 | A1* | 2/2010 | Fascenda | G06F 11/1458 713/193 |
| 2015/0227602 | A1* | 8/2015 | Ramu | G06F 16/27 707/634 |

OTHER PUBLICATIONS

Alves et al, "Design of a Backup Network for Catastrophe Scenarios", ACM, pp. 613-617, 2009 (Year: 2009).*

Maxwell et al, "Diagnosing Memory Leaks using Graph Mining on Heap Dumps", ACM, pp. 115-124 (Year: 2010).*

Kaczmarczyk et al, "Reducing fragmentation impact with forward knowledge in backup systems with deduplication", ACM, pp. 1-12 (Year: 2015).*

Simha et al, "A Scalable Deduplication and Garbage Collection Engine for Incremental Backup", ACM, pp. 1-12 (Year: 2013).*

Haque et al, "Revive: A Reliable Software Defined Data Plane Failure Recovery Scheme", IEEE, 268-274 (Year: 2018).*

* cited by examiner

SYSTEM AND METHOD FOR PROVIDING COMPREHENSIVE BACKUP OF MODULAR MOBILE DEVICES

CROSS REFERENCE TO RELATED APPLICATIONS

The current application claims priority to U.S. Patent Provisional Application No. 62/278,389, filed Jan. 13, 2016, the entire contents of which are hereby incorporated by reference.

TECHNICAL FIELD

The current disclosure generally relates to backup and recovery of a mobile device, and, more particularly, to a system and method for providing a comprehensive backup and recovery of modular configuration of a user mobile device.

BACKGROUND

Typically, when a user works with a mobile device, such as a Smartphone or tablet, the user often resets the device settings and configurations. Moreover, in some instances, physical parameters of a mobile device can change as a result of an addition (or connection) of some physical modules to the mobile device. In these cases, a special software script (i.e., a software application) or a neuro chip can be used to facilitate functionality of the connected modules. If some further modifications do not work, the mobile device and its modules and configurations need to be restored to some initial or previous state. Additionally, the mobile device can be connected to a self-taught neural network that will also need to be restored to a previous state in case of a device failure.

Conventional backup utilities generally only deal with user modified files over a period of time on a particular computer system (or a mobile device) and write these files into the backup file/memory. Moreover, conventional backup utilities are not concerned with the device configuration, connected or integrated modules, neuron chips (i.e., chips with artificial neurons) that form an associated neural network and the like. In other words, existing backup utilities mainly focus on restoration of a previous state of the data (e.g., the data files) of the computer system (or a mobile device).

Accordingly, an efficient method is desired for providing a comprehensive backup and recovery of user device modules, settings and configurations.

SUMMARY

Accordingly, the disclosure invention is directed to a system and method for backup and recovery of user mobile device modules, settings and configurations that substantially obviates one or more of the disadvantages of existing backup systems.

According to an exemplary aspect, a system is provided for backing up device data. In this aspect, the system includes a plurality of interconnected modules; electronic memory configured to store configuration and setting parameters associated with each of the plurality of interconnected modules; and a processor configured to monitor the configuration and setting parameters to detect additions and modifications to the configuration and setting parameters associated with each of the plurality of interconnected modules, and transmit the detected additions and modifications to data storage device to generate a data backup indicating a current state of the configuration and setting parameters associated with each of the plurality of modules.

According to another exemplary aspect, the processor is further configured to access, from the data storage device, the data backup when at least one module of the plurality of interconnected modules is replaced with a new module or software installed on the at least one module is reinstalled, and use the accessed data backup to set the configuration and setting parameters of the new module or the at least one module have the reinstalled software.

According to another exemplary aspect, the data storage device is a database hosted by a remote cloud computing service.

According to another exemplary aspect, the system is a modular mobile device and the plurality of interconnected modules are hardware modules connectable to the modular mobile device.

According to another exemplary aspect, the processor is further configured to monitor each of the plurality of interconnected modules by separate monitoring agents to obtain configuration and setting parameters associated with each of the plurality of interconnected modules; compare the obtained configuration and setting parameters with previous configurations and setting parameters stored in the memory of the modular mobile device; and transmit to the data storage device any detected changes to the obtained configuration and setting parameters based on results of the comparison.

According to another exemplary aspect, at least one of the plurality of interconnected modules is the memory that is connectable to the modular mobile device to store the configuration and setting parameters.

According to another exemplary aspect, at least one of the plurality of interconnected modules is wirelessly connected to a computing device including the processor and the memory.

According to another exemplary aspect, processor creates a new separate monitoring agent when a new interconnected module is added to the plurality of interconnected modules.

According to another exemplary aspect, the plurality of interconnected modules each comprise one of an antenna, an audio or video jack, a battery, a communication module, a camera, a GPS module, a sensor, electronic memory, a display screen, a projector device, a security module, an image processor, a graphics accelerator, a hardware neural and machine learning accelerator, a Quantum processor, and a timing device.

According to another exemplary aspect, the processor is further configured to update and store, in the data storage device, configurations and setting parameters of a modular device that includes the plurality of interconnected modules.

According to one exemplary aspect, a method is disclosed for providing a backup of a plurality of modules interconnected to a computing device. In this aspect, the method includes storing configuration and setting parameters associated with each of the plurality of modules interconnected to the computing device; monitoring, by a processor, the configuration and setting parameters to detect additions and modifications to the configuration and setting parameters associated with each of the plurality of modules interconnected to the computing device; and transmitting, by the processor, the configuration and setting parameters including the detected additions and modifications thereto to data storage device to generate a data backup indicating a current state of the configuration and setting parameters associated with each of the plurality of modules.

According to another aspect, a non-transitory computer readable medium comprising computer executable instructions is disclosed for providing a backup of a plurality of modules interconnected to a computing device. In this aspect, instructions are provide for storing configuration and setting parameters associated with each of the plurality of modules interconnected to the computing device; monitoring the configuration and setting parameters to detect additions and modifications to the configuration and setting parameters associated with each of the plurality of modules interconnected to the computing device; and transmitting the configuration and setting parameters including the detected additions and modifications thereto to data storage device to generate a data backup indicating a current state of the configuration and setting parameters associated with each of the plurality of modules.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION

The accompanying drawings, which are incorporated into and constitute a part of this specification, illustrate one or more example aspects of the invention and, together with the detailed description, serve to explain their principles and implementations.

DETAILED DESCRIPTION

Figure 1:
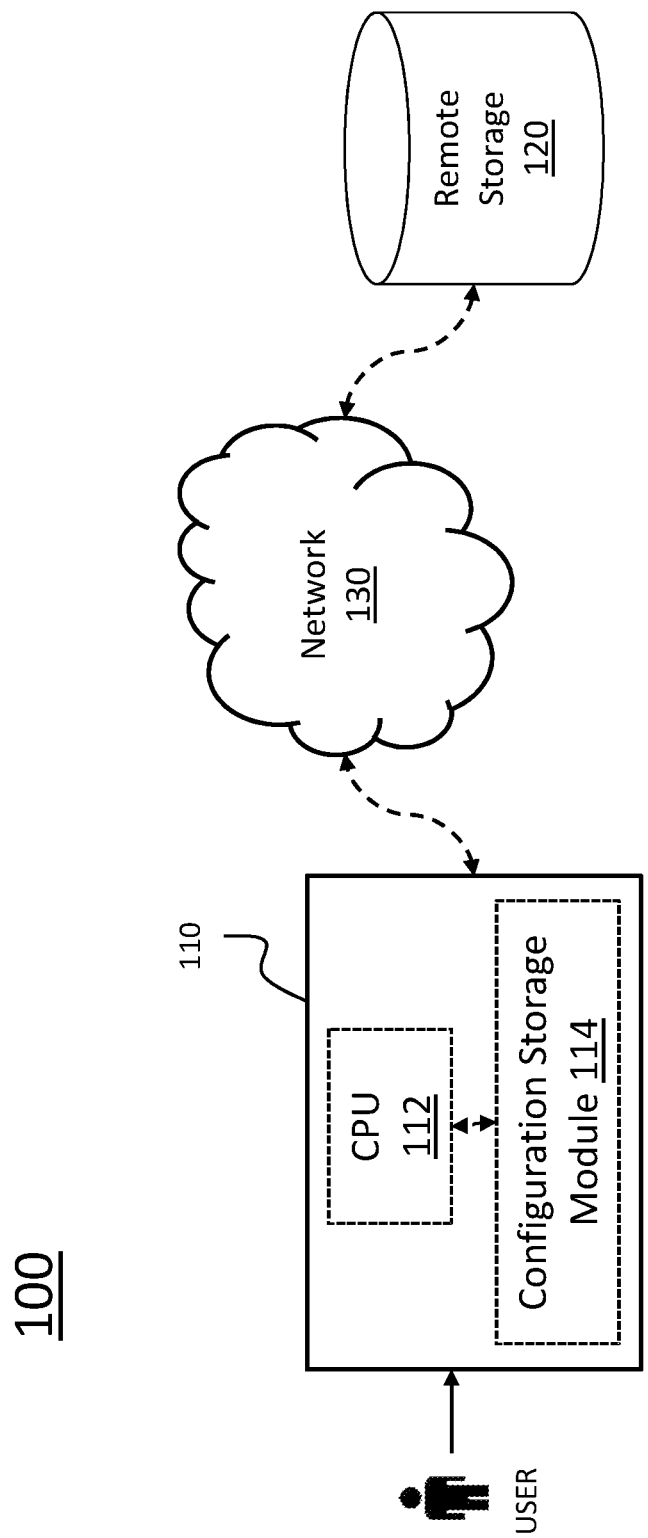
FIG. 1 illustrates a block diagram of a system for providing a comprehensive backup and recovery of modular configuration of a user mobile device according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below.

In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

In general a system and method is disclosed herein for backup and recovery of user mobile device modules, settings and configurations that substantially obviates one or more of the disadvantages of existing backup systems. More particularly, some modern electronic devices include separate modules or units or these types of such modules can be added (e.g., attached) to the main unit (i.e., main device) as a complimentary device. For example, these attachments can be "passive" (e.g., memory cards) or "active" (e.g., communication devices, such as modems, Bluetooth and WiFi chips, and the like). The system and method disclosed herein is providing for backing up the configuration of such devices and control their settings, adjust and tune parameters, and the like, when any new modules are attached. Moreover, attaching of such modules can invoke or run different services, like cloud backup. In one example, if add a camera module is added to the device, the information can be added to database where the camera is associated with a set of parameters, including device number, code number, serial number, brand name, resolution and the like, for example. The disclosed system and method manages the configurations and settings of such modules.

FIG. 1 illustrates a block diagram of a system 100 for providing a comprehensive backup and recovery of modular configuration of a user mobile device according to an exemplary aspect. In particular, the system 100 is provided to restore information where the data has been backed up from this device, for example, to an secure digital ("SD") card, to a cloud storage server, using near field communication ("NFC") and the like. The configuration can be very difficult to restore without knowing the specific configuration of the device at that moment, especially if the modular device is very complex. Moreover, by storing the configuration and settings information, an administrator, for example can establish an audit of all the communications for such a device, e.g., what devices have connected to it, where and when data was transferred from and to the device, what entity performed the data transfer, and the like. In other words, as will become readily apparent from the following description, system 100 provides a mechanism in which any actions that have been performed with a certain device can be obtained. Thus, the disclosed system 100 provide an automatic way to perform such type of a backup of modular devices so that it can be easily ascertained as to when and what modules were part of a modular unit in a given period of time.

As shown in FIG. 1, the system generally includes a client device 110, which is a modular mobile phone, for example, and a remote storage service 120. Moreover, the client device 110 is configured to communicate with the remote storage service 120 by network 130. The network 130 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network 130 may employ various well-known protocols to communicate information amongst the network resources.

In one aspect, the network 130 can be part of the Internet or intranet using various communications infrastructure such as Ethernet, WiFi and the like.

Moreover, according to the exemplary aspect, the remote storage service 120 can be any type of remote data archive, such as an online/remote file storage service, a cloud computing service and/or a blockchain network, for example. Thus, the remote data storage 120 may be one or more physical databases, distributed databases, a single storage node, a plurality of storage nodes, or the like that can be utilized to remotely store backup and recovery information from the client device 110. According to the exemplary aspect, the remote storage 120 includes a backup software utility that is configured to receive backup information (e.g., configuration and settings information received from client device 110) and storage the related information in a related database.

Moreover, in some aspects, examples of cloud based services used for the remote storage service 120 can be Amazon® Simple Storage Service ("S3"), and Microsoft® Azure ("Azure"), for example. In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

As noted above, according to the exemplary aspect, the client device 110 is a modular mobile device. In the exemplary aspect, the modular mobile device 110 includes a central processing unit ("CPU") 112 configured to execute a configuration storage module 114. Although not shown in detail in FIG. 1, the client device 110 also includes electronic memory that stores executable code that is executed by the CPU 112 to execute one or a plurality of modules configured to perform the algorithms disclosed herein, including the configuration storage module 114.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 2:
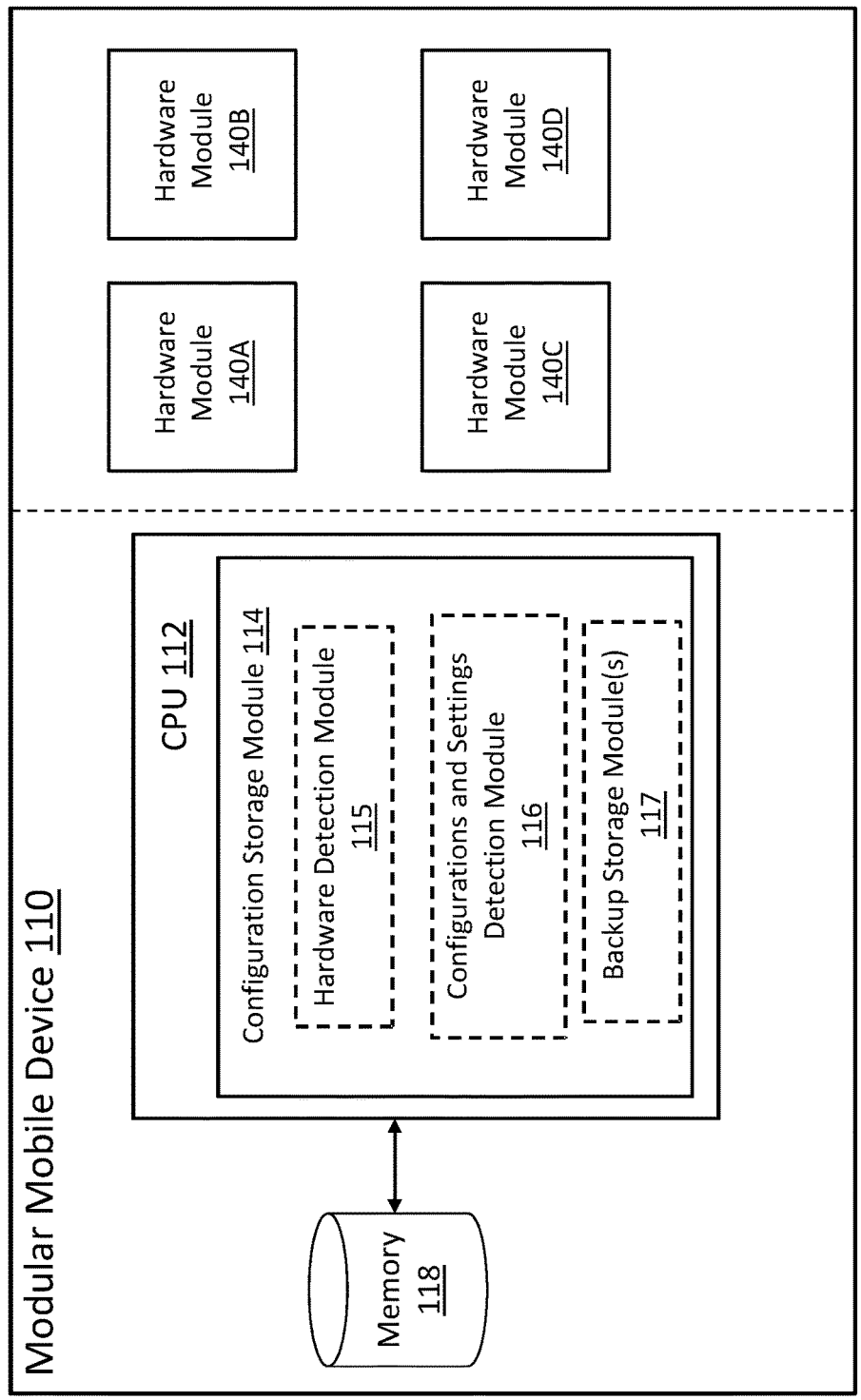
FIG. 2 illustrates a block diagram illustrating a modular mobile device for providing a comprehensive backup and recovery of the modular configurations of the device according to an exemplary aspect.

FIG. 2 illustrates a block diagram illustrating a modular mobile device 110 for providing a comprehensive backup and recovery of the modular configurations of the device according to an exemplary aspect.

In general, the configuration storage module 114 executed by CPU 112, discussed above, is configured to facilitate the backup of the modular mobile device 110 (or hyper-physical system in an alternative aspect) that includes user data, applications and software modules used by the user for servicing a plurality of connected modules 140A, 140B, 140C and 140D, and their respective module configurations and settings. For example, currently suggested modular designs include Project "Ara" by Google® that provides a mobile device that includes a number of hardware modules that provide common smartphone components, such as processors, displays, batteries, and cameras, as well as modules providing more specialized components, and "frames" that these modules were to be attached to. As a result, the individual hardware modules 140A-140D can be switched in and out of the frames of the device 110 to enable the device to be upgraded over time with new capabilities and upgraded specifications without requiring the purchase of an entirely new device, providing a longer lifecycle for the device and potentially reducing electronic waste.

As shown in FIG. 2, the configuration storage module 114 of the modular client device 110 includes a plurality of sub-modules, including hardware detection module 115, configuration and settings detection module 116 and backup storage module 117. It should be appreciated that each of these modules can be executed as a sub-module of configuration storage module 114, as separate modules altogether, or one single module.

Moreover, according to the exemplary aspect, hardware detection module 115 is configured to detect the insertion and removal of hardware modules 140A-140D. Thus, each time a user of modular mobile device 110 adds a new hardware module (or replaces an existing hardware module), the new hardware module will be provided with power from the device (e.g., a battery, which can also be one of the hardware modules), which in turn provides a signal indicating the type of module, that it is operating correctly and that it is configured to operate with the modular mobile device 110 and/or other hardware modules connected to the, and the like, as would be appreciated to one skilled in the art.

Thus, for example, if one or more new modules (e.g., module 140B, which can be Bluetooth module, for example) is added to the modular mobile device 110, the hardware detection module 115 will detect the insertion of this module, which will then cause the configuration and settings detection module 116 to detect initial configuration and parameter settings, as well as any subsequent changes in these configurations and settings. The initial configuration and parameter settings can be stored in memory 118 and also transmitted to remote data storage 120, for example. Then, each time a module is added, software for the module is updated, or periodically, for example, the configuration and settings detection module 116 accesses the configuration and parameters settings of that device (which may be stored in local memory of the device) and compares the accessed information with previously stored information to determine if any of the configurations and parameter settings have changed. Moreover, in addition to the configurations and settings for each module, the system can also store in memory 118 and/or remote data storage 120 configurations and setting parameters of the modular device that includes the plurality of interconnected modules as the configurations and settings of the whole device will also change when each individual module is changed or added, for example.

The configuration and parameter settings information may include specific details regarding security (e.g., encryption information), wireless communication settings, power savings mode for each module, and the like. In one example, if the hardware module is a Bluetooth module that is configured to communicatively couple the modular mobile device 110 to a specific set of wireless speaks, for example, the configuration and settings detection module 116 can identify and record the required "pairing" configuration information for the two devices (i.e., the mobile device 110 and speakers, for example) to communicate with one another. This configuration and setting information can be stored in memory 118, for example, by backup storage module 117. In another aspect, backup storage module 117 is configured to transmit the backup to remote storage 120.

Moreover, the same backup procedure can be implemented for a done for near-field communication ("NFC") module, for example, in which the backup storage module 117 stores reconfiguration data. As discussed in detail below, some hardware modules can contain their own backup or configuration agent used uniquely for each module. Moreover, it is contemplated that the individual agent can migrate unused files (for example, images made by a camera of the mobile device) to the remote storage 120 or the agent can encrypt data received from other modules and targeted for the associated hardware module. In turn, the agent can decide what configuration data to be stored locally or remotely. For example, if the system needs to free local storage space, the agent can move some files to remote storage. Alternatively, the agent can monitor the access to a file where the frequently used files can be stored locally and the less frequent or rarely used files can be moved to remote storage.

Moreover, according to an exemplary aspect, the backup storage module 117 is configured to execute the appropriate backup procedures for the new system configuration identified by and execute configuration and settings detection module 116. In general, it should be appreciated that each hardware module 140A-140C has a set of parameters and configuration settings that are subject to backup. These parameters and configurations are passed on to the backup utility running at the remote storage 120 by the backup storage module 117 running on the modular mobile device 110. Thus, in this aspect, the backup storage module 117 informs the backup utility on the remote storage 120 of a new connection on the modular mobile device 110 detected by hardware detection module 115 and provides the module(s) configuration data to the backup utility.

It should be appreciated that by generating a backup of the configurations and setting information of each hardware module 140A-140D, the user of the modular mobile device 110 is able to seamlessly replace specific hardware modules or even recreate the device (if it is lost, for example) without having to remember preferred configurations, settings and the like. For example, the backup utility running on the remote storage 120 can be used for antivirus and data verification solutions in one aspect. Moreover, the backup utility can be used for modular mobile device 110 device cleanup and application of initial configurations if, for example, the device 110 becomes too slow.

In one example, the modular mobile device 110 may become slow if it stores/writes/collects too much service data, logs, cookies, temporary files, and the like, which is typical for Windows® or Android® operating systems. In such situations, device users should reinstall operating system from time to time. By saving the specific configurations and settings for each hardware module 140A-140D, the operating system can be safely reinstalled and quickly placed back into an existing state prior to the reinstallation operation. In this instance, the backup storage module 117 is configured to access the stored configuration and settings in remote storage 120 (e.g., by controlling the modular mobile device 110 to transmit a request to remote storage 120) and apply this configurations and settings to each hardware module 140A-140D currently connected to the modular mobile device 110.

According to an exemplary aspect, each hardware module 140A-140D can have its own backup module configured to periodically backup the respective hardware module. In other words, separate backup storage modules 117 can be provided and associated with each hardware module 140A-140D. In a similar manner as described above, the separate backup storage modules 117 can be executable software (e.g., firmware) that sends a command to initiate backup of any data that its associated hardware module produces or creates or receives from outside devices and/or other hardware modules, for example.

According to yet another exemplary aspect, one of the hardware modules (e.g., hardware module 140A) can be a backup device, including memory and software such as backup storage module 117, that can be plugged into a modular system to provide a local backup of the other hardware modules 140B-140D that are connected to the modular mobile device 110. Moreover, in one aspect, this backup hardware module 140A includes wireless data communication functionality (or utilizes a wireless communication module of modular mobile device 110) to transmit backup data of the other hardware modules 140B-140D to a remote central backup utility, such as remote storage 120.

According to a refinement of this exemplary aspect, the backup storage module 117 is configured to automatically adjusts to the modular structure of the modular mobile device 110. In this regard, the backup agent determines the optimal way for a data backup procedure depending on which modules are plugged in. For example, the backup agent can prioritize the modules and perform the data backup procedure depending on which modules are most important for the device and/or user functionality, etc. In another aspect, the optimality can depend on cost, e.g., the cost of storage space and/or channel speed (i.e., GSM and WiFi have different costs for data transferring). It should be appreciated that module configuration preferably is self-sufficient. Moreover, in one example, if a storage module is added as a new hardware module to modular mobile device 110, an additional capability for the backup storage module 117 is automatically added based on recognition of the added module. For example, the backup storage module 117 can backup this space to remote data storage 120, reserve memory space and clear out the stored data (e.g., it can migrate non-accessed picture files to the remote data storage 120).

As further described above, the backup stored in remote storage 120 can include data needed to restore a physical module, such as a 3-D printing utility (or its modification) from a standard module design, including combination of software, stored data and physical capabilities. Advantageously, these backup capabilities can be critical for the next generation of self-adjustable physical designs, swarm bots, nano-modules, and the like. Examples of such hardware modules 140A-140D can include, for example, antennas, audio jacks, batteries, Bluetooth modules (as discussed above), cameras, GPS modules, gyroscopes, storage (RAM and permanent storage), video jacks (such as HDMI), Wi-Fi modules, dual sim modules, radiation sensor modules, bio-sensor module, high quality audio modules, specialized modules for the medical industry (e.g., biological sensors including thermometer, glucose tester, blood test, urine test, eye exam), display screens, projector devices, security modules (e.g., encryption and decryption devices), image processors, graphics accelerators, hardware neural and machine learning accelerators, Quantum processors, timing devices, and the like.

Figure 3:
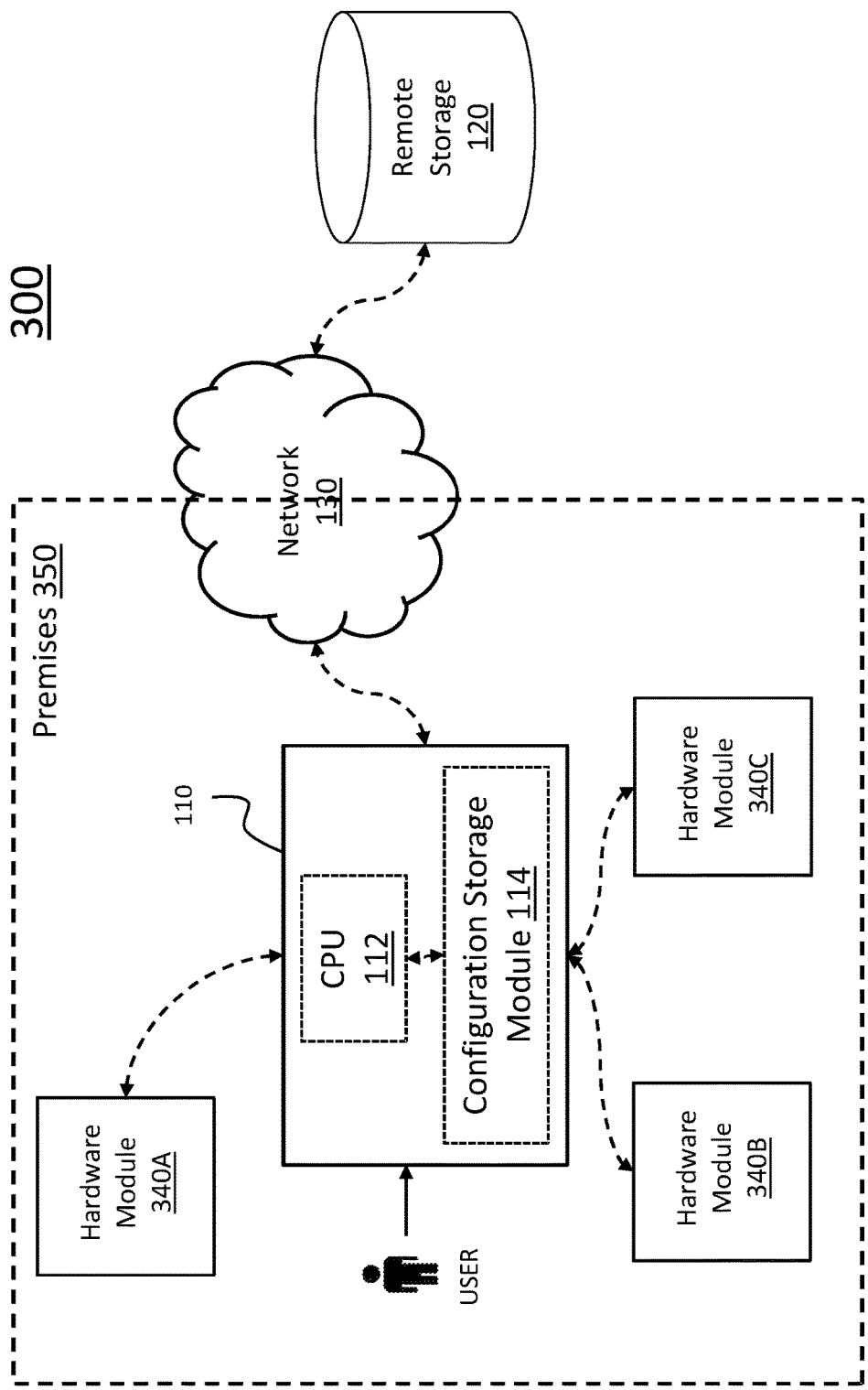
FIG. 3 illustrates a block diagram of a system for providing a comprehensive backup and recovery of modular configuration according to another exemplary aspect.

FIG. 3 illustrates a block diagram of a system 300 for providing a comprehensive backup and recovery of modular configuration according to another exemplary aspect. As shown, the system 300 is similar to system 100 described above in that system 300 generally includes a client device 110, which is a modular mobile phone, for example, and a remote storage service 120. Moreover, the client device 110 is configured to communicate with the remote storage service 120 by network 130. The detailed description of these components will not be repeated herein as they are described above.

However, according to the exemplary aspect, system 300 contemplates that the modular device assembly is not physical, but rather virtual in that the hardware modules 340A-340C are located in relative proximity to the mobile device 110 and wireless connected thereto. For example, system 300 can include the mobile device 110, which can be a smartphone, for example, as well as a plurality of wirelessly connected hardware modules 340A-340C, which can be a "smart" watch or "smart" glasses that are connected over non-physical connection (e.g., a WiFi or Bluetooth connection) with mobile device 110. Thus, it is contemplated that these combination of devices are effectively functioning as a single modular device, e.g., using wireless protocols, NFC, Miracast standard, Chromecast (by Google®), "throw" technologies and the like. Thus, according to this exemplary aspect, the mobile device 110, which includes configuration storage module 114, is configured to transmit a request to each connected hardware module 340A-340C to request and obtain configurations and setting information for each of these devices. Moreover, in one aspect, this information can then be transmitted to remote storage 120 via network 130 (which can be formed within and without a premises 350), for example. In other aspect, the backup of the configurations and setting information can be stored locally on mobile device 110 or even on another local computing device communicatively coupled with mobile device 110.

Thus, according to an exemplary aspect, the configuration storage module 114 provides a backup that can be used with the group of connected modular devices. In a refinement of this aspect, it is contemplated that the premises 350 can be a smart house system controlled by a user mobile device 110. Thus, the system 300 has numerous interconnected modules 340A-340C (e.g., appliances, thermostats, lighting, etc.) that need to be backed up at certain point of their connection and configuration (including operating parameters, schedules, etc.).

In one aspect, these hardware modules 340A-340C can also have integrated neuro-chips and be connected into a neural network that is part of the premises 350. Thus, in this aspect, this type of backup can also be applied to neurochips (e.g., Verilog-like applications) and neural networks receiving data from these multiple devices. In the case of a neural network, the backup information obtained by configuration storage module 114 can contain the restore data instead of the actual network data. Moreover, the backup generated can include a sequence of teaching events (or subsequences) that produced a state of the neural network being restored, which can also be saved at remote storage 120, for example. This can be more efficient than restoring the actual neural network, which can be quite large.

It is further contemplated that if a hardware module or device has a secure mode of operation, the data and parameters related to the secure operation can also be provided to the backup utility running on remote storage 120, for example. A secure mode of operation includes any protected methods for any operations, such as data transfer, communication, data archiving, and the like. The secure mode of operation is secured by cryptography, using secure protocols and algorithms, for example. In an alternative aspect, the secure mode of operation can include methods that limit some or all the communications to avoid potentially dangerous situations, hacker's attacks, and the like. In one aspect, one security module can automatically turn on a security mode of operations for other devices and/or hardware modules. Then, security configuration of the specific module is backed up. For example, the security module can have the keys stored on the external device. This provides a secure channel for transferring the backup data from physical devices to the backup utility on the remote storage 120. In one aspect, the security module can be plugged in to the client device 110 for temporary protection and for elimination of access to the other hardware devices. Once this module is removed, the secure communication can be re-initiated.

According to a further aspect, a secure mode of operation of the modular assembly of the modular mobile device 110 can be implemented by temporarily removing all communications modules (e.g., of the hardware modules 140A-140D) from the assembly of the user device 110. Then, the modular mobile device 110 can be used for secure data storing and physical transfer. Moreover, a combination of modules can be used for secure mode—e.g., only a special combination of modules can allow some operations. Some module data can be sent via independent channels that are considered safe (e.g., Dallas lock) or special secure online channels or off-line temporary storage need to be implemented.

Figure 4:
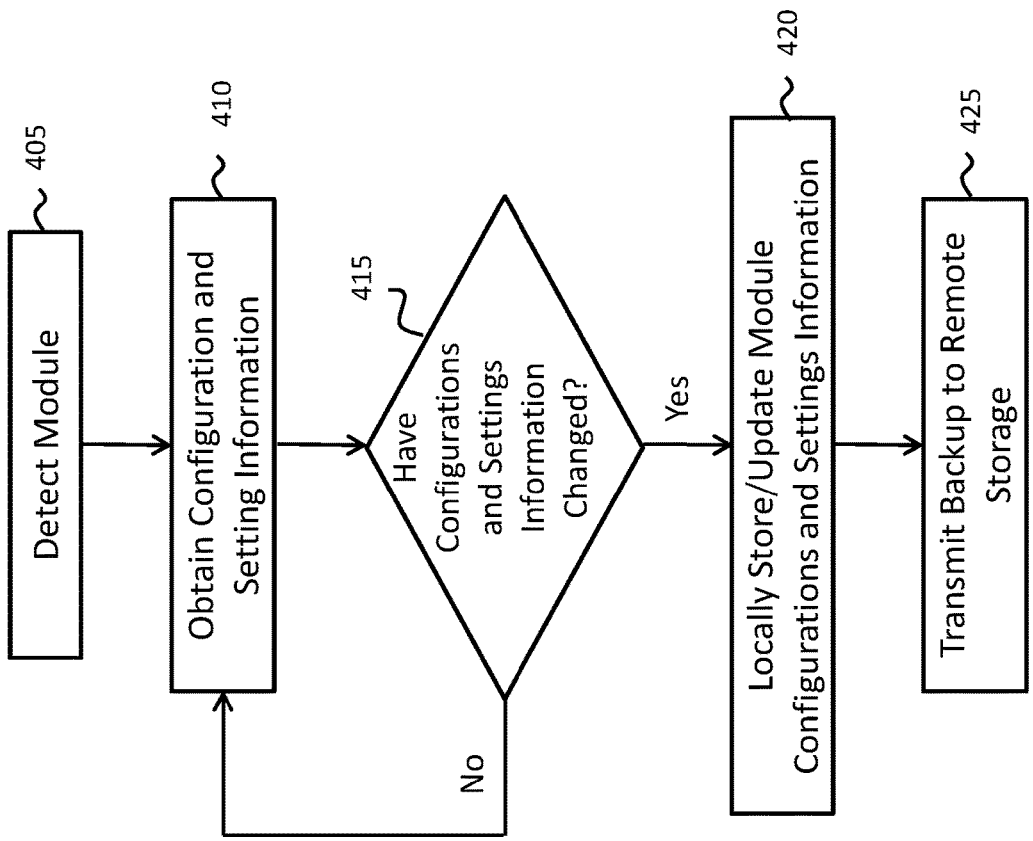
FIG. 4 illustrates a flowchart for a method for providing a comprehensive backup and recovery of modular configuration of a user mobile device according to an exemplary aspect.

FIG. 4 illustrates a flowchart for a method for providing a comprehensive backup and recovery of modular configuration of a user mobile device according to an exemplary aspect. It should be appreciated that the following description of the disclosed process refers to the exemplary components discussed above.

Initially, at step 405, the modular mobile device 110, and specifically, the hardware detection module 115 is in a monitoring state to monitor each of the "frame" (i.e., hardware module connections) to detect the addition (or removal) of a hardware module (e.g., modules 140A-140D) to modular mobile device 110. Next, at step 410, the configurations and settings detection module 116 obtains the related data for the newly detected hardware module. As described above, this information can include each device's settings, including deice operation settings, user settings, connection with other modules and outside devices, and the like. In one refinement of this aspect, the configurations and settings detection module 116 is configured to poll each connected hardware module on a periodic basis (e.g., hourly, daily, etc.).

Furthermore, in an exemplary aspect, the modular mobile device 110 is configured to store existing settings in local memory 118 (or remote storage 120). In this case, the configurations and settings detection module 116 is then configured to compare the previously stored information with the currently obtained configurations and setting information for the hardware module. If there have been no changes detected from the previous time a backup was performed, the method returns to step 410 or alternatively step 405. However, if a change of this information is detected, the method proceeds to step 420 where the newly detected or changed information is updated in local memory 118 of modular mobile device. Finally, at step 425, the backup information can be transmitted to a remote storage 120, such as a cloud service where the information is securely stored. Advantageously, because the configuration and settings information is backed up on a remote storage, it can easily be accessed by module mobile device 110 if one or more of the hardware modules 140A-140D needs to be replaced to place the new module in the same exact state as that of the previous module. As a result, the user of module mobile device 110 obtains a seamless transition without needing to worry about monitoring current configuration settings before changing one or more of the modules.

Figure 5:
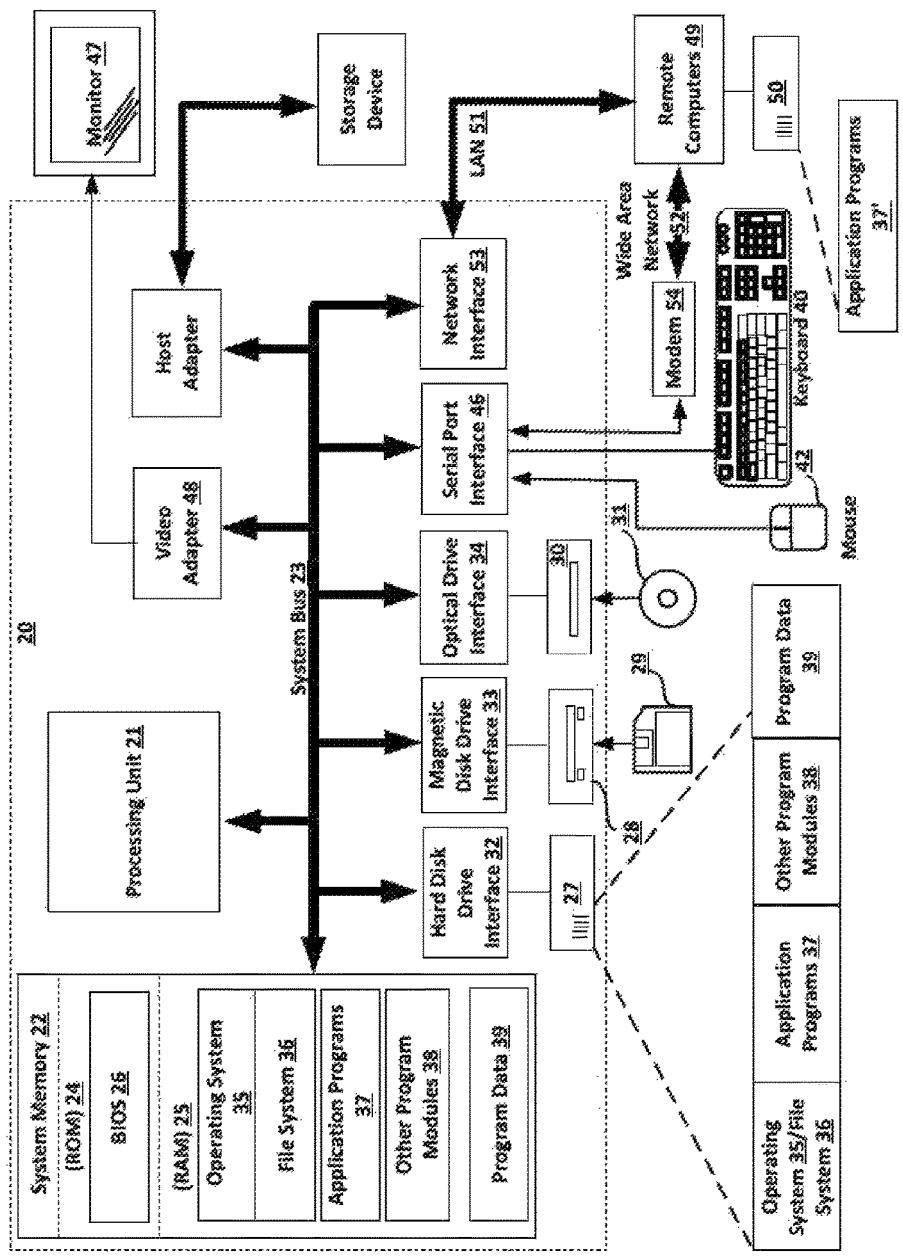
FIG. 5 illustrates a block diagram of an example of a general-purpose computer system on which the disclosed system and method can be implemented according to an example aspect.

FIG. 5 illustrates a block diagram of an example of a general-purpose computer system on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to modular client device 110, processing unit 21 can correspond to CPU 112, and system memory 22 can correspond memory 118

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment. It should be appreciated that each of these memory devices can correspond to a hardware module 140A-14D, according to one exemplary aspect.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for backing up device data from a modular mobile device, the system comprising:
    a plurality of interconnected hardware modules that are configured to be attachable and removable from the modular mobile device;
    electronic memory configured to store configuration and setting parameters associated with each of the plurality of interconnected hardware modules; and
    a processor configured to:
        monitor the configuration and
        setting parameters to detect additions and modifications to the configuration and setting parameters associated with each of the plurality of interconnected hardware modules by comparing previous configurations setting parameters stored in the memory of the modular mobile device with the detected additions and modifications;
        transmit the detected additions and modifications to a data storage device; and
        execute a data backup indicating a current state of the configuration and setting parameters associated with each of the plurality of hardware modules.

2. The system according to claim 1, wherein the processor is further configured to:
    access, from the data storage device, the data backup when at least one module of the plurality of interconnected modules is replaced with a new module or software installed on the at least one module is reinstalled, and
    use the accessed data backup to set the configuration and setting parameters of the new module or the at least one module have the reinstalled software.

3. The system according to claim 1, wherein the data storage device is a database hosted by a remote cloud computing service.

4. The system according to claim 1, wherein the processor is further configured to:
    monitor each of the plurality of interconnected hardware modules by separate monitoring agents to obtain configuration and setting parameters associated with each of the plurality of interconnected hardware modules;
    compare the obtained configuration and setting parameters with previous configurations and setting parameters stored in the memory of the modular mobile device; and
    transmit to the data storage device any detected changes to the obtained configuration and setting parameters based on results of the comparison.

5. The system according to claim 4, wherein the processor creates a new separate monitoring agent when a new interconnected module is added to the plurality of interconnected modules.

6. The system according to claim 1, wherein at least one of the plurality of interconnected hardware modules is the memory that is connectable to the modular mobile device to store the configuration and setting parameters.

7. The system according to claim 1, wherein at least one of the plurality of interconnected modules is wirelessly connected to a computing device including the processor and the memory.

8. The system according to claim 1, wherein the plurality of interconnected modules each comprise one of an antenna, an audio or video jack, a battery, a communication module, a camera, a GPS module, a sensor, electronic memory, a display screen, a projector device, a security module, an image processor, a graphics accelerator, a hardware neural and machine learning accelerator, a Quantum processor, and a timing device.

9. The system of claim 1, wherein the processor is further configured to update and store, in the data storage device, configurations and setting parameters of a modular device that includes the plurality of interconnected modules.

10. A method for providing a backup of a plurality of hardware modules interconnected to a modular mobile device, the method comprising:
    storing configuration and setting parameters associated with each of the plurality of hardware modules interconnected to the modular mobile device;
    monitoring, by a processor,
    the configuration and setting
        parameters to detect additions and modifications to the configuration and setting
    parameters associated with each of the plurality of hardware modules interconnected to the modular mobile device by comparing previous configurations setting parameters stored in the memory of the modular mobile device with the detected additions and modifications, when one of the plurality of hardware modules is attached or removed from the modular mobile device;
    transmitting, by the processor, the configuration and setting parameters including the detected additions and modifications thereto to data storage device; and
    executing a data backup indicating a current state of the configuration and setting parameters associated with each of the plurality of hardware modules.

11. The method according to claim 10, further comprising:
    accessing, from the data storage device, the data backup when at least one module of the plurality of modules is replaced with a new module or software installed on the at least one module is reinstalled; and
    using, by the processor, the accessed data backup to set the configuration and setting parameters of the new module or the at least one module have the reinstalled software.

12. The method according to claim 10, wherein the data storage device is a database hosted by a remote cloud computing service.

13. The method according to claim 10, further comprising:
    monitoring each of the plurality of hardware modules by separate monitoring agents to obtain configuration and setting parameters associated with each of the plurality of hardware modules;

comparing, by the processor, the obtained configuration and setting parameters with previous configurations and setting parameters stored in memory of the modular mobile device; and transmitting, to the data storage device, any detected changes to the obtained configuration and setting parameters based on results of the comparison.

14. The method according to claim 13, further comprising creating a new separate monitoring agent when a new interconnected module is added to the plurality of interconnected modules.

15. The method according to claim 10, wherein at least one of the plurality of modules is wirelessly interconnected to the computing device.

16. The method of claim 10, further comprising updating and storing, in the data storage device, configurations and setting parameters of a modular device that includes the plurality of interconnected modules.

17. A non-transitory computer readable medium comprising computer executable instructions for providing a backup of a plurality of hardware modules interconnected to a modular mobile device, including instructions for:

storing configuration and setting parameters associated with each of the plurality of hardware modules interconnected to the modular mobile device;

monitoring the configuration and setting parameters to detect additions and modifications to the configuration and setting parameters associated with each of the plurality of hardware modules interconnected to the modular mobile device by comparing previous configurations setting parameters stored in the memory of the modular mobile device with the detected additions and modifications, when one of the plurality of hardware modules is attached or removed from the modular mobile device;

transmitting the configuration and setting parameters including the detected additions and modifications thereto to data storage device; and executing a data backup indicating a current state of the configuration and setting parameters associated with each of the plurality of hardware modules.

18. The non-transitory computer readable medium according to claim 17, further including instructions for:

accessing, from the data storage device, the data backup when at least one module of the plurality of hardware modules is replaced with a new module or software installed on the at least one module is reinstalled; and using the accessed data backup to set the configuration and setting parameters of the new module or the at least one hardware module have the reinstalled software.

* * * * *